No. 722,748. PATENTED MAR. 17, 1903.
H. C. PETERS.
FLY NET HOLDER.
APPLICATION FILED FEB. 6, 1902.
NO MODEL.
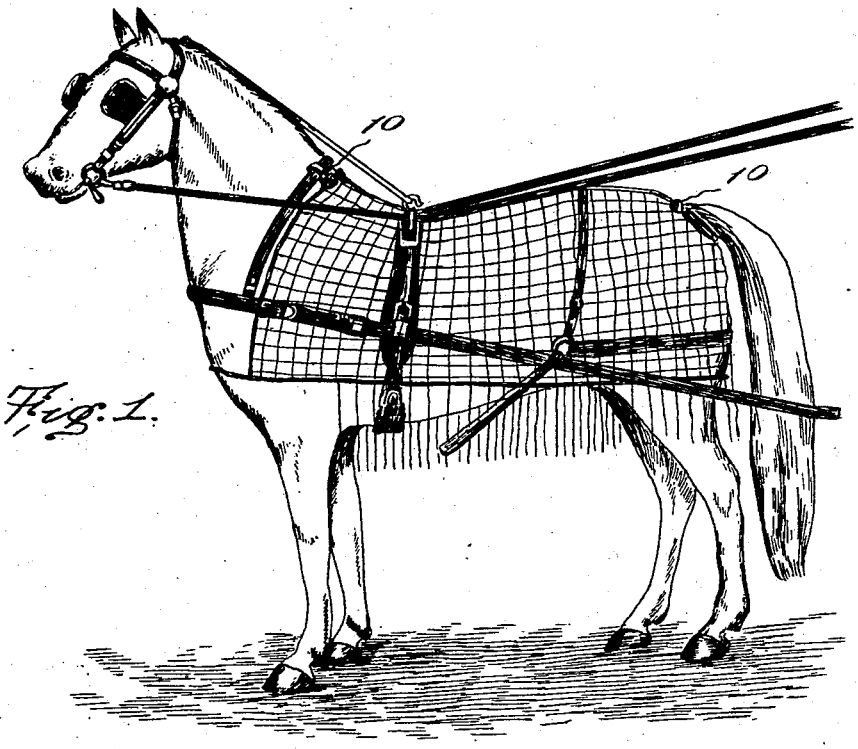
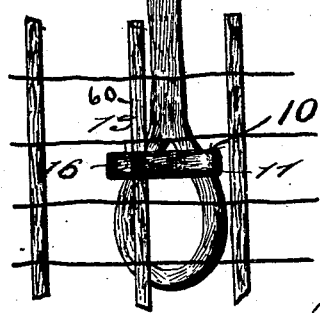
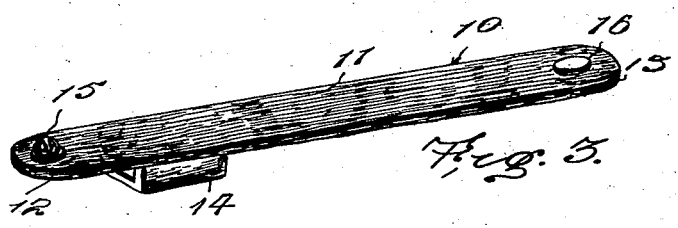
Witnesses
Harry C. Peters Inventor
by C. A. Snow & Co.
Attorneys

UNITED STATES PATENT OFFICE.

HARRY CHESTER PETERS, OF SIOUX CITY, IOWA.

FLY-NET HOLDER.

SPECIFICATION forming part of Letters Patent No. 722,748, dated March 17, 1903.

Application filed February 6, 1902. Serial No. 92,864. (No model.)

*To all whom it may concern:*

Be it known that I, HARRY CHESTER PETERS, a citizen of the United States, residing at Sioux City, in the county of Woodbury and State of Iowa, have invented a new and useful Fly-Net Holder, of which the following is a specification.

This invention relates to an improved fastener or holder especially adapted for attaching fly-nets to a harness.

The object of the invention is to provide a device of simple and economic construction capable of convenient and expeditious manipulation and attachment to any fly-net and to any part of the harness and one which will not be liable to chafe or rub the animal to which the net is applied.

Figure 1 of the accompanying drawings represents a side elevation of a horse having a net attached to the harness by this improved holder. Fig. 2 represents an enlarged detail view of a crupper-strap with this holder applied thereto and showing a portion of a fly-net in position. Fig. 3 represents an enlarged perspective view of this improved holder in open position. Fig. 4 is an enlarged sectional view taken on the line $x$ $x$ in Fig. 2 and showing the device in position.

The same reference-numerals indicate corresponding parts in all the figures.

My improved fastener, which as a whole is designated 10, consists of a strap 11, made of leather or any other suitable flexible material. 14 is a loop or keeper attached to the under side of said strap near one end thereof by stitching or in any other convenient manner. The end of the strap 11 nearest the loop or keeper 14 is designated 12. The strap 11 is provided near its end 12 at a point between said end and the loop or keeper upon the opposite side of the strap with a spring or expansion-stud 15, which projects upwardly therefrom on the face opposite the face to which the keeper is attached and is arranged to enter a metal socket 16, carried by the other end 13 of the strap 11 on the same side as the keeper 14.

In the use of this device the strap 11 is placed under one of the straps of a harness and will be described as applied to the crupper-strap. The strap 11 is so placed that the keeper 14 is disposed next to the horse or other animal, and the end 13 is then passed around one side of the crupper, through the loop or keeper 14, around the other side of the crupper and the fly-net strap 60, which lies close thereto, and then the socket 16 is pressed down over the stud 15 and the device is fastened, the fly-net being held by the strap 60, which is the back-strap thereof, being held inclosed and in contact with the crupper by the strap 11. As is well known, the crupper widens gradually, and the net-holder 10 is thus held from slipping down toward the tail of the animal, thereby holding the net securely in place.

This holder 10 may also be used to fasten the net to the breast-strap or any other part of the harness by operating the strap 11 as above described. These fastening-straps may be left attached to the harness after being once applied, and when it is desired to use the fly-net all that is necessary is to pass the end 13 around a strap or mesh of the net and clamp the end 13 to the end 12 by pressing the socket 16 down over the stud 15.

This holder 10 being made of leather is comparatively soft and pliable and avoids danger of rubbing the horse, which is liable to occur when metal clips are used for fastening the net to the harness. It is snapped and fastened or unfastened in an instant and is thoroughly reliable in its engagement.

The device is also adapted for holding a blanket on an animal, and instead of employing the snap-fastener an ordinary buckle may be used for connecting the ends of the straps.

I claim as my invention—

The combination with a crupper and with the back-strap of a fly-net placed closely adjacent to one side thereof, of a fastening device comprising a strap provided on its under side with a loop disposed between the sides of the crupper, one end of said strap being passed around one side of the crupper, through the loop, around the other side of the crupper and the fly-net strap adjacent thereto and then connected detachably with the other end of said strap, the respective ends of said strap being provided with fastening members whereby such connection may be effected, substantially as set forth.

In testimony that I claim the foregoing as my own I have hereto affixed my signature in the presence of two witnesses.

HARRY CHESTER PETERS.

Witnesses:
   A. B. WALKER,
   E. W. PETERS.